United States Patent [19]

Muntnich et al.

[11] Patent Number: 5,114,249

[45] Date of Patent: May 19, 1992

[54] AXIAL ROLLING BEARING

[75] Inventors: Leo Muntnich, Aurachtal; Wolfgang Steinberger; Wilfried Soyka, both of Herzogenaurach, all of Fed. Rep. of Germany

[73] Assignee: INA Walzlager Schaeffler KG, Fed. Rep. of Germany

[21] Appl. No.: 740,886

[22] Filed: Aug. 6, 1991

Related U.S. Application Data

[63] Continuation of Ser. No. 577,267, Sep. 4, 1990, abandoned.

[30] Foreign Application Priority Data

Oct. 26, 1989 [DE] Fed. Rep. of Germany ....... 3935637

[51] Int. Cl.⁵ .............................................. F16C 33/58
[52] U.S. Cl. ..................................... 384/622; 384/620
[58] Field of Search ........................... 384/618–623, 384/609, 615, 617, 611

[56] References Cited

U.S. PATENT DOCUMENTS

| | | | |
|---|---|---|---|
| 2,891,828 | 6/1959 | Winchell | 384/621 |
| 3,938,867 | 2/1976 | Johnston | 384/622 |
| 3,981,549 | 9/1976 | Carullo | 384/622 |
| 4,042,285 | 8/1977 | Dorsch | 384/621 |
| 4,783,183 | 11/1988 | Gardella | 384/622 X |
| 4,892,424 | 1/1990 | Christenson | 384/620 |

Primary Examiner—Thomas R. Hannon
Attorney, Agent, or Firm—Bierman and Muserlian

[57] ABSTRACT

An axial rolling bearing comprising a cage containing rolling elements and arranged between two plane-parallel, thin-walled bearing discs made of sheet metal, wherein the three components together form a structural unit by engaging together in a form-locking manner and at least one of the bearing discs merges at one of its peripheral edges into an axially directed collar which engages around the cage with clearance and extends into the region of the second bearing disc characterized in that there is a narrow guiding clearance at at least some peripheral points between the mutually facing peripheral surface of the collar and of the second bearing disc respectively.

6 Claims, 1 Drawing Sheet

AXIAL ROLLING BEARING

PRIOR APPLICATION

This application is a continuation of U.S. patent application Ser. No. 577,267, filed Sep. 4, 1990, now abandoned.

STATE OF THE ART

Axial rolling bearings comprising a cage containing rolling elements and arranged between two plane-parallel, thin-walled bearing discs made particularly of sheet metal, wherein the three components together form a structural unit by engaging behind one another in a form-locking manner and at least one of the bearing discs merges at one of its peripheral edges into an axially directed collar which engages around the cage with clearance and extends into the region of the second bearing disc are known from U.S. Pat. No. 2,891,828. The disadvantage of this bearing resides in the fact that the cage can come into contact with the bearing discs during operation. This is particularly the case when such axial bearings are used in convertors of automobile gearboxes wherein, in certain operational states, the so-called shaft disc lifts off the rolling elements in the axial direction with the result that the set of balls guided in the cage is freed of load and falls radially inwards and comes into contact either with the shaft or with the collar of the shaft disc. Then if the so-called housing disc is not centered in the housing, it falls likewise radially inwards and bears against the cage. When the shaft disc then comes into contact with the rolling elements again, the cage gets clamped-in and this leads to functional disorders and undesired high noise development.

OBJECTS OF THE INVENTION

It is object of the invention to avoid the described disadvantages and to form the bearing discs in a simple manner so that a clamping-in of the cage is avoided.

This and other objects and advantages of the invention will become obvious from the following detailed description.

THE INVENTION

The novel axial rolling bearing of the invention comprising a cage containing rolling elements and arranged between two plane-parallel, thin-walled bearing discs made of sheet metal, wherein the three components together form a structural unit by engaging behind one another in a form-locking manner and at least one of the bearing discs merges at one of its peripherial edges into an axially directed collar which engages around the cage with clearance and extends into the region of the second bearing disc, is characterized in that there is a narrow guiding clearance at at least some peripheral points between the mutually facing peripheral surfaces of the collar and of the second bearing disc, respectively.

Since at least one of the bearing discs possesses a narrow guiding clearance at at least some peripheral points between the mutually facing peripheral surfaces of the collar and of the second bearing disc respectively, it is achieved that the cage can rotate freely between the bearing discs since no forces whatever originating in the bearing discs can act on it. In this way, not only is wear reduced, but the service life of such a bearing is also considerably prolonged.

A further development of the invention provides that one of the bearing discs comprises an axially directed collar at its outer peripheral edge and the other at its inner peripheral edge. A particularly advantageous design is obtained if each of the collars engages axially behind the cage. By this, it is achieved in a simple manner that the narrow guiding clearance between the mutually facing surfaces can be envisaged either at the inner or at the outer diameter of the bearing disc, depending on the manner of assembly.

To this end, it is possible according to a variant of the invention, that individual retaining lugs spaced over the periphery be provided at the peripheral surface of the collar facing the second bearing disc. However, it is also conceivable that a peripheral rim be formed on the peripheral surface of the collar facing the second bearing disc so that the two bearing discs are connected to the interposed cage to form a structural unit in a manner known in itself, and at the same time, a mutual guidance of the bearing discs at their inner or outer peripheral surface is obtained.

Referring now to the drawings.

Figure 1:
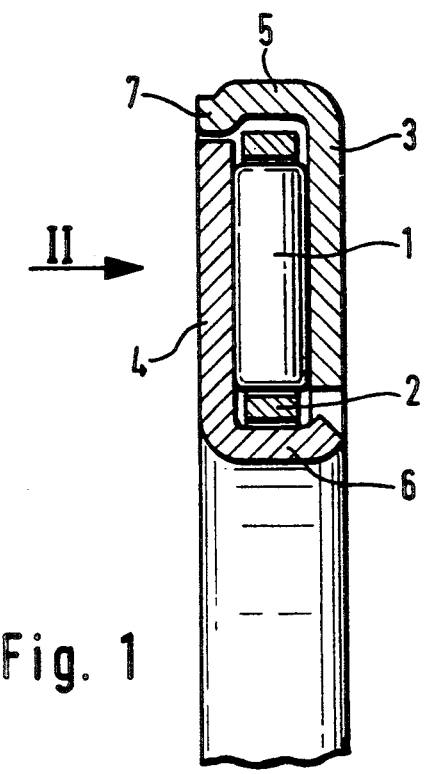
FIG. 1 is an axial rolling bearing in a partial longitudinal cross-section.
Figure 2:
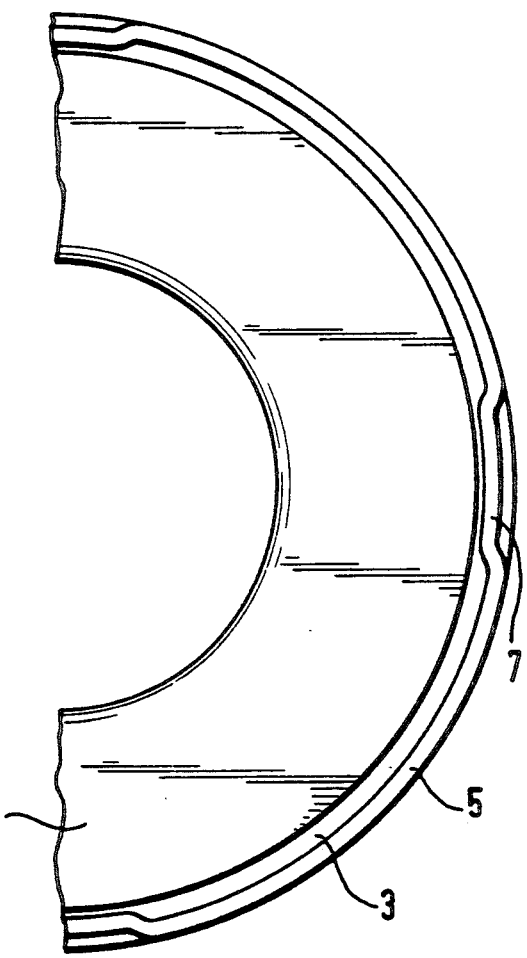
FIG. 2 is a top view of the bearing of FIG. 1.

In FIGS. 1 and 2, the axial rolling bearing comprises a cage 2 containing rolling elements 1 and arranged between two plane-parallel, thin-walled bearing discs 3 and 4 made particularly of sheet metal, wherein the three components 2, 3 and 4 together form a structural unit by engaging behind one another in a form-locking manner. The bearing disc 3 comprises an axially directed collar 5 at its outer peripheral edge and the bearing disc 4 has a collar 6 at its inner peripheral edge. The collars 5 and 6 engage around the cage 2 with clearance and extend axially into the regions of the second bearing disc 4 and 3, respectively.

According to FIG. 2, the bearing disc 3 possesses a narrow guiding clearance at some peripheral points between the mutually facing peripheral surfaces of the collar 5 and of the second bearing disc 4. To obtain this, individual retaining lugs 7 spaced over the periphery are provided at the peripheral surface of the collar 5 facing the second bearing disc 4.

Figure 3:
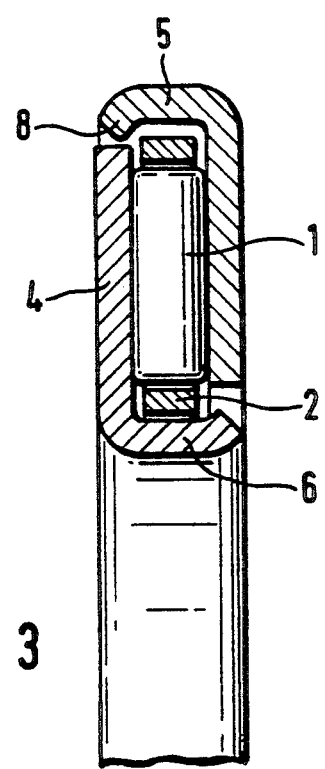
FIG. 3 is another embodiment of an axial rolling bearing of the invention in a partial longitudinal cross-section.

The embodiment of FIG. 3 differs from that of FIGS. 1 and 2 only in that, instead of the retaining lugs 7, a peripheral rim 8 is formed on the peripheral surface of the collar facing the second bearing disc 4.

Various modifications of the bearings of the invention may be made without departing from the spirit or scope thereof and it is to be understood that the invention is intended to be limited only as defined in the appended claims.

What we claim is:

1. An axial rolling bearing comprising a cage containing rolling elements and arranged between two plane-parallel, thin-walled bearing discs made of sheet metal, wherein the three components form a structural unit by engaging together in a forming-locking manner and at least the first of the bearing discs mergers at its outer circumferential edge into an axially directed first collar which engages around the cage with clearance and extends into the region of the second bearing disc characterized in that there is a narrow guiding clearance at at least some peripheral points between the mutually facing circumferential surfaces of the first collar and of the second bearing disc respectively.

2. An axial rolling bearing of claim 1 wherein said second disc comprises an axially directed second collar at its inner peripheral edge.

3. An axial rolling bearing of claim 2 wherein each of the collars engages axially behind the cage.

4. An axial rolling bearing of claim 2 wherein a circumferential rim is formed on the peripheral surface of the first collar facing the second bearing disc.

5. An axial rolling bearing of claim 1 wherein individual retaining lugs spaced over the periphery are provided at the peripheral surface of the first collar facing the second bearing disc.

6. An axial rolling bearing of claim 1 wherein a circumferential rim is formed on the peripheral surface of the first collar facing the second bearing disc.

* * * * *